United States Patent
Nakai et al.

[11] Patent Number: 5,962,167
[45] Date of Patent: Oct. 5, 1999

[54] NON-AQUEOUS LIQUID ELECTROLYTE SECONDARY CELL

[75] Inventors: Kenji Nakai; Manabu Ochida, both of Tokyo, Japan

[73] Assignee: Shin-Kobe Electric Machinery Co., Ltd., Tokyo, Japan

[21] Appl. No.: 08/934,832

[22] Filed: Sep. 22, 1997

[30] Foreign Application Priority Data

Sep. 24, 1996 [JP] Japan ................................ 8-251312
Sep. 24, 1996 [JP] Japan ................................ 8-251313
Jan. 27, 1997 [JP] Japan ................................ 9-012259

[51] Int. Cl.$^6$ .................................................. H01M 4/48
[52] U.S. Cl. ......................... 429/231.1; 429/53; 429/332
[58] Field of Search ................................. 429/218, 223, 429/53, 57, 59, 194, 197, 231.1, 332

[56] References Cited

U.S. PATENT DOCUMENTS

| | | | |
|---|---|---|---|
| 4,465,747 | 8/1984 | Evans | 429/194 |
| 5,427,875 | 6/1995 | Yamamoto et al. | 429/223 |
| 5,443,930 | 8/1995 | Shoji et al. | 429/224 |
| 5,567,539 | 10/1996 | Takahashi et al. | . |
| 5,766,791 | 6/1998 | Takahashi et al. | 429/53 X |

FOREIGN PATENT DOCUMENTS 329269 of 1992 Japan .
338323 of 1994 Japan .

*Primary Examiner*—Stephen Kalafut
*Attorney, Agent, or Firm*—Pearne, Gordon, McCoy & Granger LLP

[57] ABSTRACT

A non-aqueous liquid electrolyte secondary cell capable of preventing bursting or explosion thereof even when a current breaking device or a relief valve for pressure release fails in operation thereof due to any trouble or failure thereof. The cell includes a wound-up body formed by laminatedly spirally winding up a positive electrode and a negative electrode together while interposing a separator therebetween. The wound-up body thus formed is received in a cell can. The negative electrode is constructed by forming a negative active material layer containing amorphous carbon on each of both surfaces of a negative collector. The positive electrode is constructed by forming a positive active material layer containing $Li_xCoO_2$ on each of both surfaces of a positive collector. The negative electrode is electrically connected to the cell can through a negative electrode lead. The positive electrode is electrically connected to the cell lid through a positive electrode lead joined to a connection plate of the cell lid by welding.

7 Claims, 10 Drawing Sheets

NON-AQUEOUS LIQUID ELECTROLYTE SECONDARY CELL

BACKGROUND OF THE INVENTION

This invention relates to a non-aqueous liquid electrolyte secondary cell, and more particularly to a non-aqueous liquid electrolyte secondary cell having a lithium double oxide and a material which is capable of occluding and releasing lithium ions or has lithium ion occluding and releasing properties incorporated therein so as to act as a positive active material and a negative active material, respectively.

There has been conventionally known a non-aqueous liquid electrolyte secondary cell in the art which includes a positive electrode and a negative electrode wherein the positive electrode has a positive active material layer containing a positive active material consisting of a lithium double oxide formed on a positive collector and the negative electrode has a negative active material layer containing a negative active material having lithium ion occluding and releasing properties formed on a negative collector. Such a non-aqueous liquid electrolyte secondary cell has been extensively used for a potable electric/electronic equipment such as a VTR camera, a note-type personal computer, a portable telephone or the like, because it is increased in energy density. Active materials incorporated in the non-aqueous liquid electrolyte secondary cell are chemically active, so that a non-aqueous liquid electrode of the cell is deteriorated in performance when water intrudes thereinto. In order to eliminate the disadvantage, the non-aqueous liquid electrolyte secondary cell is constructed into a hermetically sealed structure. Unfortunately, such a hermetically sealed structure causes an internal pressure of the cell to be increased due to gas generated by decomposition of the electrolyte, leading to bursting of a cell case of the non-aqueous liquid electrolyte secondary cell, resulting in damage to a peripheral equipment, when it falls into a supercharged state due to any trouble or failure of a charging circuit. In order to solve such a problem, it was proposed that the cell case of the non-aqueous liquid electrolyte secondary cell is provided therein with a current breaking device such as a pressure switch for interrupting electrical connection between the electrodes and cell terminals when the internal pressure is increased, as detailedly discussed in U.S. Pat. No. 5,567,539, which corresponds to Japanese Patent Application Laid-Open Publication No. 102331/1996 (8-102331), and the like.

Nevertheless, arrangement of such a current breaking device often leads to generation of heat in the cell case which causes a rapid increase in temperature of the cell rather than generation of gas therein in the supercharged state, before an increase in internal pressure of the cell due to generation of gas by decomposition of the electrolyte permits operation of the current breaking device to be carried out. In the worst case, the heat generation often causes uselessness of the current breaking device, leading to breakage or explosion of the cell. In order to avoid such a situation, techniques of incorporating an additive such as lithium carbonate or lithium oxalate in the positive active material were proposed as disclosed in Japanese Patent Application Laid-Open Publication No. 329269/1992 (4-329269) and U.S. Pat. No. 5,427,875 which corresponds to Japanese Patent Application Laid-Open Publication No. 328278/1992 (4-328278). Incorporation of the additive in the positive active material permits carbon dioxide to be generated due to electrochemical decomposition of lithium carbonate or lithium oxalate contained in the positive active material, when the cell is subject to supercharging. It would be considered that carbon dioxide thus generated acts to not only restrain any abnormal reaction which causes heat generation leading to a rapid increase in temperature of the cell, but increase an internal pressure of the cell to ensure positive actuation of the current breaking device. However, actually, the additive thus incorporated in the positive active material fails to fully restrain such a temperature increase of the cell depending on supercharged conditions thereof. In particular, in techniques disclosed in Japanese Patent Application Laid-Open 329269/1992 described above, in order to effectively decompose lithium oxalate, the positive active material is mixed with lithium carbonate to prepare a mixture, which is then subject to a heat treatment, to thereby permit lithium carbonate to be contained in the positive active material. Unfortunately, this causes particles of the positive active material to be increased in size, leading to a decrease in specific surface area of the active material, resulting in current density being increased, so that the non-aqueous liquid electrolyte secondary cell may be deteriorated in both high-rate discharge characteristics and low-temperature discharge characteristics.

In order to solve the problem, it was proposed to incorporate an additive such as manganese carbonate, cobalt carbonate, nickel carbonate, sodium carbonate, potassium carbonate, rubidium carbonate, magnesium carbonate, calcium carbonate, barium carbonate or the like in the positive active material layer, as disclosed in Japanese Patent Application Laid-Open Publication No. 338323/1994 (6-338323) and U.S. Pat. No. 5,567,539, which corresponds to Japanese Patent Application Laid-Open Publication No. 102331/1996 (8-102331). Use of such an additive solves the problem described above.

Nevertheless, incorporation of the additive in the positive active material very rarely causes a failure in actuation of the current breaking device when an internal pressure of the cell is increased due to generation of gas by decomposition of the electrolyte owing to overcharging of the cell, even if it restrains a rapid increase in temperature of the cell. This would be due to materials for components for the current breaking device, assembling of the device and quality of welding for joining between the components. Such a failure in actuation of the current breaking device further promotes supercharging of the cell to increase a voltage across the cell, to thereby increase a charging current correspondingly, when the additive for restraining an increase in temperature of the cell as described above is incorporated in the positive active material. Such an increase in rate of increase in charging current causes abnormal or excessive heat generation, so that a rate at which the electrolyte is decomposed is increased correspondingly. This possibly causes early bursting or explosion of the cell when it is not provided with a relief valve for releasing an internal pressure of the cell. When the relief valve is arranged, operation of the valve reduces an internal pressure of the cell; however, it possibly causes an electrolyte to leak to an outside of the cell, leading to damage to a peripheral equipment.

SUMMARY OF THE INVENTION

The present invention has been made in view of the foregoing disadvantage of the prior art.

Accordingly, it is an object of the present invention to provide a non-aqueous liquid electrolyte secondary cell which is capable of effectively preventing bursting or explosion of the cell even in the worst situation wherein a current breaking device or a relief valve is kept from operating during supercharging of the cell.

In accordance with the present invention, a non-aqueous liquid electrolyte secondary cell is provided. The non-aqueous liquid electrolyte secondary cell includes a positive electrode including a positive collector on which a positive active material layer containing a positive active material consisting of a lithium double oxide and any one of a phosphate compound and strontium carbonate is formed, a negative electrode including a negative collector on which a negative active material layer containing a negative active material having lithium ion occluding and releasing properties is formed, and a current breaking device for interrupting electrical connection between the electrodes and cell terminals.

The inventors made a study of an additive which restrains substantial decomposition of an electrolyte causing excessive heat generation and a substantial increase in charging current, even when a current breaking device fails in operation thereof due to any trouble or failure, to thereby cause supercharging of the cell to proceed, resulting in a cell voltage being continuously increased. As a result, the inventors found that a phosphate compound or strontium carbonate acts as the additive. Incorporation of such an additive in the positive active material layer effectively restrains an increase in charging current after an internal pressure of the cell exceeds a pressure at which a current breaking device operates, in the case that the device fails in operation due to any trouble or failure. Thus, the non-aqueous liquid electrolyte secondary cell of the present invention prevents a significant increase in charging current to keep excessive or abnormal heat generation from occurring, even when the current breaking device fails in operation due to any trouble or failure thereof to cause supercharging to further continue. Thus, it effectively prevents decomposition of the electrolyte. Also, the cell of the present invention effectively prevents bursting or explosion thereof even when the relief valve for pressure release is not arranged therein or fails in operation due to any failure or trouble.

The phosphate compounds suitable for use in the present invention preferably include lithium phosphate ($Li_3PO_4$) and cobalt (II) phosphate [$Co_3(PO_4)_2$]. Also, any other suitable phosphate compounds such as $K_3PO_4$, $Ca PO_4)_2$, $Na_3PO_4$, $Na_2HPO_4$, $NaH_2PO_4$, $MgNH_4PO_4$, $(NH_4)_2HPO_4$, $(NH_4)H_2PO_4$, $Na_2HPO_4$, $NaH_2PO_4$, $Fe_3(PO_4)_2$, $(CH_3C_6H_4)_3 PO_4$, $(C_6H_5)_3PO_4$ and the like may be likewise conveniently used for this purpose. Further, the phosphate compounds suitable for use in the present invention may include hydrated phosphate compounds.

The phosphate compound may be contained in an amount of 0.2 to 15% by weight based on the positive active material. A decrease in content of the phosphate compound to a level below 0.2% by weight leads to an increase in occurrence of bursting or explosion of the cell. Whereas, an increase in the content to a level above 15% by weight causes a deterioration in discharge capacity of the cell.

The phosphate compound preferably has an average particle diameter of 30 $\mu$m or less. An average particle size of the phosphor compound above 30 $\mu$m causes an increase in a ratio of specific surface area of the compound to a weight thereof, to thereby delay generation of gas with respect to an increase in cell voltage, leading to a failure in effective operation of the current breaking device.

The lithium double oxides include $Li_xMO_2$ such as $Li_xCoO_2$, $Li_xNiO_2$, $Li_xMnO_2$ and the like, wherein M is at least one transition metal and x is between 0.05 and 1.10 ($0.05 \leq x \leq 1.10$).

The non-aqueous liquid electrolyte secondary cell of the present invention may further include a relief valve for releasing a pressure in the cell when an internal pressure of the cell reaches a predetermined level or above. The positive electrode and negative electrode may be spirally wound up while interposing an electrolyte layer containing the non-aqueous liquid electrolyte therebetween, to thereby form the cell into a cylindrical shape.

BRIEF DESCRIPTION OF THE DRAWINGS

These and other objects and many of the attendant advantage of the present invention will be readily appreciated as the same becomes better understood by reference to the following detailed description when considered in connection with the accompanying drawings; wherein.

DETAILED DESCRIPTION OF THE PREFERRED EMBODIMENT

Now, a non-aqueous liquid electrolyte secondary cell according to the present invention will be described hereinafter with reference to the accompanying drawings.

Figure 1:
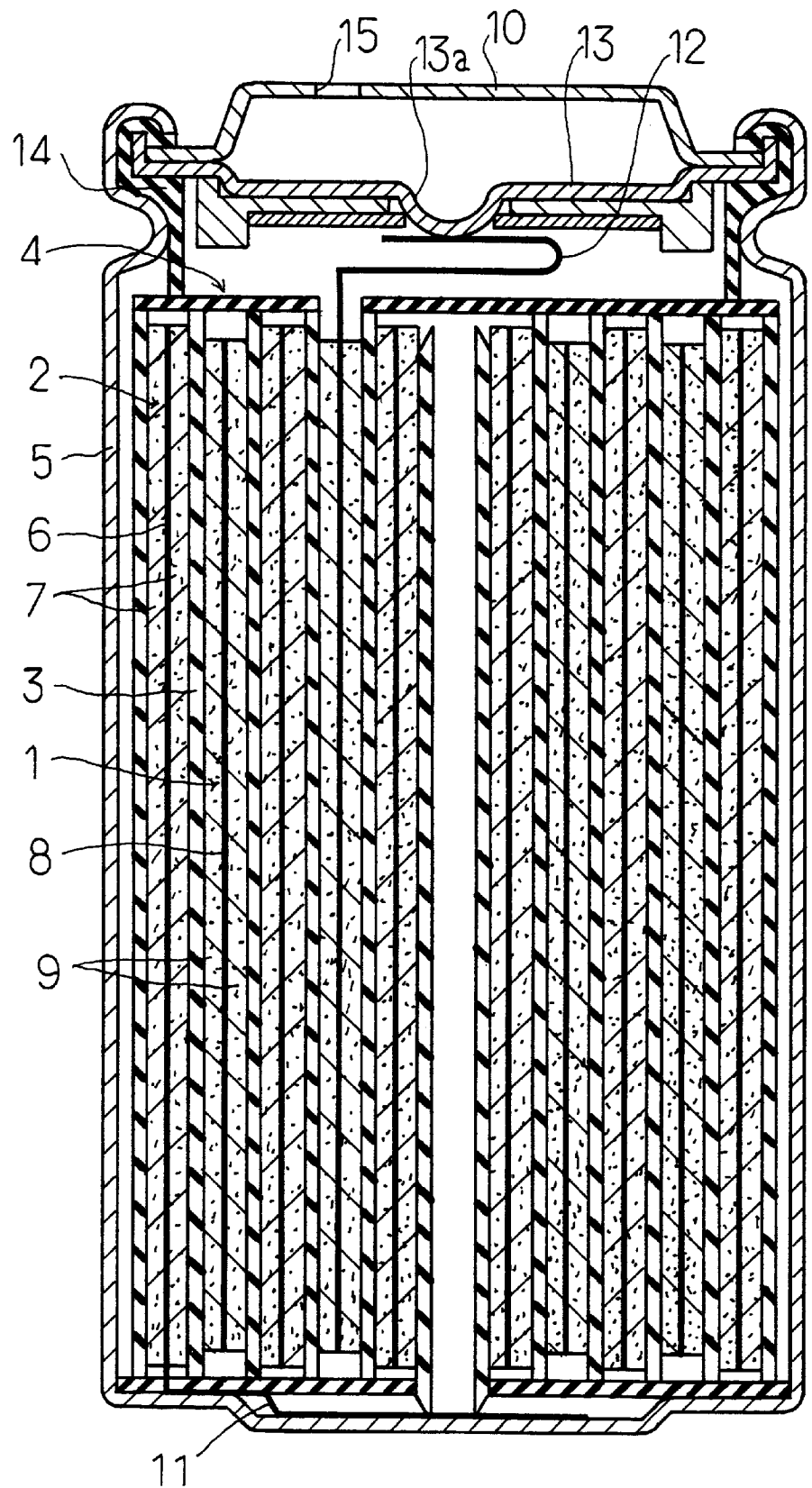
FIG. 1 is a schematic sectional view showing an embodiment of a non-aqueous liquid electrolyte secondary cell according to the present invention.
Figure 2:
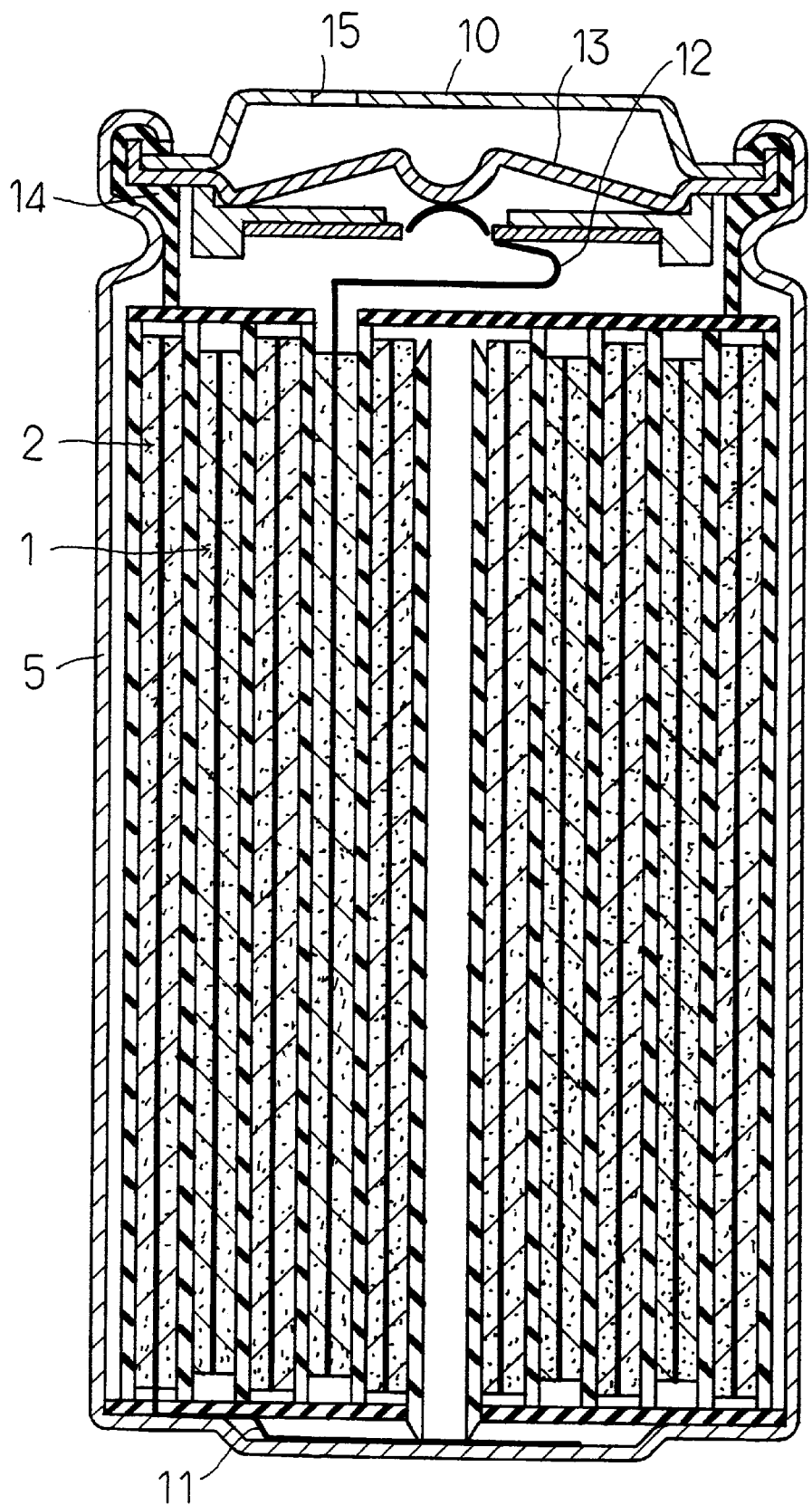
FIG. 2 is a schematic sectional view of the non-aqueous liquid electrolyte secondary cell shown in FIG. 1 wherein a current breaking device is in operation.

Referring first to FIG. 1, an embodiment of a non-aqueous liquid electrolyte secondary cell according to the present invention which is equipped with a current breaking device is generally illustrated. A non-aqueous liquid electrolyte secondary cell of the illustrated embodiment includes a wound-up body 4 formed by laminatedly spirally winding up a positive electrode 1 and a negative electrode 2 together while interposing a separator 3 therebetween. The wound-up body 4 thus formed is arranged or received in a cell can 5. The negative electrode 2 is constructed by forming a negative active material layer 7 on each of both surfaces of a negative collector 6. The positive electrode 1 is constructed by forming a positive active material layer 9 on each of both surfaces of a positive collector 8. The cell can 5 is mounted thereon with a cell lid 10 through an insulating sealing gasket 14. The negative electrode 2 is electrically connected to the cell can 5 through a negative electrode lead 11. Also, the positive electrode 1 is electrically connected to the cell lid 10 through a positive electrode lead 12 joined to a recess 13a of a connection plate 13 of the cell lid 10 by welding. The connection plate 13 is constructed so as to be upwardly forced or pushed, to thereby be deformed as shown in FIG. 2, when an internal pressure of the cell is excessively or abnormally increased. This results in the positive electrode lead 12 being broken at a portion thereof joined to the connection plate 13 by welding, to thereby interrupt flowing of a current therethrough. Thus, in the cell shown in FIG. 1, the positive electrode lead 12 and connection plate 13 cooperate with each other to provide a current breaking device. The cell lid 10 is formed with a through-hole 15 for selectively releasing a pressure in the cell. The connection plate 13 is formed with a cross notch (not shown) of a depth reduced to a degree sufficient to permit the cutout to be broken when a pressure in the cell is increased to a predetermined level higher than an internal pressure of the cell which permits operation of the current breaking device, so that gas generated in the cell may be outwardly discharged from the cell via the through-hole 15 and the notch broken. Thus, in the illustrated embodiment, the notch of the connection plate 13 and the through-hole 15 of the cell lid 10 cooperate with each other to provide a relief valve.

The present invention will be understood more readily with reference to the following examples; however, these examples are intended to illustrate the invention and are not to be construed to limit the scope of the invention.

EXAMPLE 1

A non-aqueous liquid electrolytic secondary cell of the present invention which is constructed in such a manner as shown in FIG. 1 was prepared. First, the positive electrode 1 was formed. For this purpose, three gradients or a positive active material consisting of $Li_xCoO_2$ (x=1.0) powder of 1 to 2 $\mu$m in average particle diameter, graphite powder of 0.5 $\mu$m in average particle diameter and a binder consisting of polyvinylidene fluoride (PVDF) were fully kneaded together at a weight ratio of 80:10:10, to thereby prepare a kneaded mixture. Then, a suitable amount of dispersing solvent consisting of N-methyl-2-pyrrolidone was added to the kneaded mixture and then both were fully kneaded together to form an ink-like intimate mixture. Subsequently, to the ink-like mixture thus formed was added lithium phosphate ($Li_3PO_4$) powder in an amount of 5% by weight based on the positive active material ($Li_xCoO_2$) prepared by Mitsuwa Kagaku Yakuhin Kabushiki Kaisha (a Japanese corporation), to thereby prepare an ink-like kneaded material for a positive active material. Thereafter, the kneaded material was coated on each of both surfaces of the positive collector 8 made of an aluminum foil having a size of 20 $\mu$m×50 mm×450 mm, followed by drying of the kneaded material, resulting in the positive active material layer 9 of 100 $\mu$m in thickness being formed on each of both surfaces of the positive collector 8, to thereby provide the positive electrode 1.

Then, the negative electrode 2 was formed. First, two gradients or amorphous carbon having lithium ion occluding and releasing properties and a binder consisting of polyvinylidene fluoride (PVDF) were fully kneaded together at a weight ratio of 90:10, to thereby prepare a kneaded mixture. Then, a suitable amount of dispersing solvent consisting of N-methyl-2-pyrrolidone was added to the kneaded mixture and then both were fully kneaded together to form an ink-like kneaded mixture for the negative active material. Thereafter, the kneaded mixture was coated on each of both surfaces of the negative collector 6 made of a copper foil having a size of 10 $\mu$m×50 mm×490 mm, followed by drying of the kneaded material, resulting in the negative active material layer 7 of 100 $\mu$m in thickness being formed on each of both surfaces of the negative collector 6, to thereby provide the negative electrode 2.

Then, the positive electrode 1 and negative electrode 2 were wound up together while interposing therebetween the separator 3 made of a microporous polyethylene film, to thereby provide the wound-up body 4, which was then received in the cell can 5 of a cylindrical shape. The negative electrode lead 11 connected to the negative electrode 2 was electrically connected to the cell can 5 by welding and then the positive electrode lead 12 was connected to the recess 13a of the connection plate 13 of the cell lid 10 by welding. Subsequently, a non-aqueous liquid electrolyte was prepared by dissolving 1 mol/l of $LiPF_6$ in a solvent obtained by mixing propylene carbonate, dimethyl carbonate and diethyl carbonate with each other, followed by charging of the thus-prepared electrolyte in the cell can 5. Mixing of propylene carbonate, dimethyl carbonate and diethyl carbonate was carried out at a volume ratio of 30:55:15.

Thereafter, the cell lid 10 was placed on the cell can 5 through the insulating sealing gasket 14. Then, the cell can 5 was subject to caulking in a such a manner that an opening surrounds a peripheral edge of the cell lid 10, to thereby hermetically close the cell can 5, resulting in the non-aqueous liquid electrolyte secondary cell being assembled. The current breaking device constituted by the positive electrode lead 12 and connection plate 13 was constructed so as to operate when an internal pressure of the can 5 reaches a level of 6 to 8 kg/cm$^2$. Also, the relief valve was constructed so as to openably operate at a pressure of from 10

EXAMPLE 2

The procedure described in Example 1 was substantially repeated except that cobalt (II) phosphate [$Co_3(PO_4)$] powder of 5 μm in average particle diameter was added in an amount of 5% by weight based on $Li_xCoO_2$ to the positive active material in place of the lithium phosphate powder.

EXAMPLE 3

The procedure described in Example 1 was substantially repeated except that strontium carbonate ($SrCO_3$) powder of 5 μm in average particle diameter was added in an amount of 5% by weight based on $Li_xCoO_2$ to the positive active material in place of the lithium phosphate powder.

Comparative Example 1

The procedure described in Example 1 was substantially repeated except that lithium phosphate powder was not added to the positive active material layer.

Comparative Examples 2 to 12

Comparative Example 2 was executed according to the procedure described in Example 1 except that lithium carbonate ($Li_2CO_3$) powder was added to the positive active material layer in place of the lithium phosphate powder. Comparative Example 3 was carried out according to the procedure described in Example 1 except that lithium oxalate ($LiC_2O_4$) powder was added to the positive active material layer in place of the lithium phosphate powder. Comparative Example 4 was practiced according to the procedure described in Example 1 except that manganese carbonate ($MnCO_3$) powder was added to the positive active material layer in place of the lithium phosphate powder. Comparative Example 5 took place according to the procedure described in Example 1 except that cobalt carbonate ($CoCO_3$) powder was added to the positive active material layer in place of the lithium phosphate powder. Comparative Example 6 was executed according to the procedure described in Example 1 except that nickel carbonate ($NiCO_3$) powder was added to the positive active material layer in place of the lithium phosphate powder. Comparative Example 7 was executed according to the procedure described in Example 1 except that sodium carbonate ($Na_2CO_3$) powder was added to the positive active material layer in place of the lithium phosphate powder. Comparative Example 8 was executed according to the procedure described in Example 1 except that potassium carbonate ($K_2CO_3$) powder was added to the positive active material layer in place of the lithium phosphate powder. Comparative Example 9 was executed according to the procedure described in Example 1 except that rubidium carbonate ($Rb_2CO_3$) powder was added to the positive active material layer in place of the lithium phosphate powder. Comparative Example 10 was executed according to the procedure described in Example 1 except that calcium carbonate ($CaCO_3$) powder was added to the positive active material layer in place of the lithium phosphate powder. Comparative Example 11 was executed according to the procedure described in Example 1 except that magnesium carbonate ($MgCO_3$) powder was added to the positive active material layer in place of the lithium phosphate powder. Comparative Example 12 was executed according to the procedure described in Example 1 except that barium carbonate ($BaCO_3$) powder was added to the positive active material layer in place of the lithium phosphate powder. In each of the comparative examples, the additive incorporated in the positive active material layer in place of lithium phosphate had an average particle diameter of 5 μm which is the same as that of the lithium phosphate powder in Example 1. Also, the amount in which each of the additives was incorporated in the positive active material layer was 5% by weight based on $Li_xCoO_2$ as in Example 1.

Then, the cell obtained in each of the comparative examples was subject to full charging to a voltage level of 4.2 V. Then, the positive electrode of each of the cells and the negative electrode thereof were cut into a size of 20 mm×20 mm and that of 21 mm×21 mm, respectively. Subsequently, the positive and negative electrodes thus cut were arranged opposite to each other with the non-aqueous liquid electrolyte being interposed therebetween, to thereby provide a test cell. Thereafter, each of the test cells was subject to potential sweep wherein a charging voltage was applied to the test cell at a rate of 0.1 mV/sec, to thereby obtain relationship between a current of the test cell and a voltage thereof. The results were as shown in FIGS. 3 to 17.

In each of FIGS. 3 to 17, a peak appearing near a voltage of 4.6 V is an oxidation peak occurring due to separation of a large amount of Li from the positive active material ($Li_xCoO_2$) and is not due to electrochemical decomposition of the electrolyte and/or additive. Occurrence of electrochemical decomposition of the electrolyte and/or additive is indicated by a small current peak appearing near a voltage of 5 to 5.1 V. At the time of occurrence of the small current peak, the additive is electrochemically decomposed to promote decomposition of the electrolyte. Thus, the electrolyte is decomposed to generate gas when the small current peak occurs, so that the current breaking device is actuated for interruption of flowing of a charging current. A voltage which causes occurrence of the small current peak is called a decomposition voltage. When the current breaking device fails in operation thereof due to any trouble or failure, a charging current flowing after the small current peak occurs causes further decomposition of the electrolyte, leading to further generation of the gas. Therefore, a charging current flowing beyond the decomposition voltage promotes decomposition of the electrolyte. It will be noted that the cell of each of FIGS. 6 to 17 causes a current to be substantially increased when a voltage thereof rises more than about 5 to 5.1 V, to thereby exceed the decomposition voltage.

Figure 3:
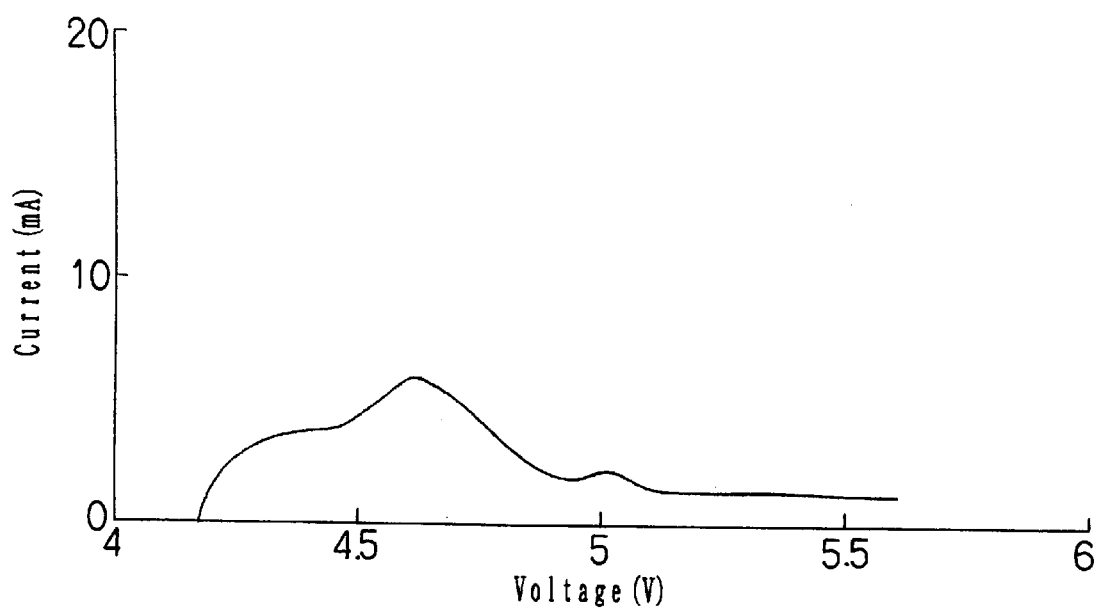
FIG. 3 is a graphical representation showing relationship between a current and a voltage which was obtained by subjecting a cell prepared in Example 1 to voltage sweep.
Figure 4:
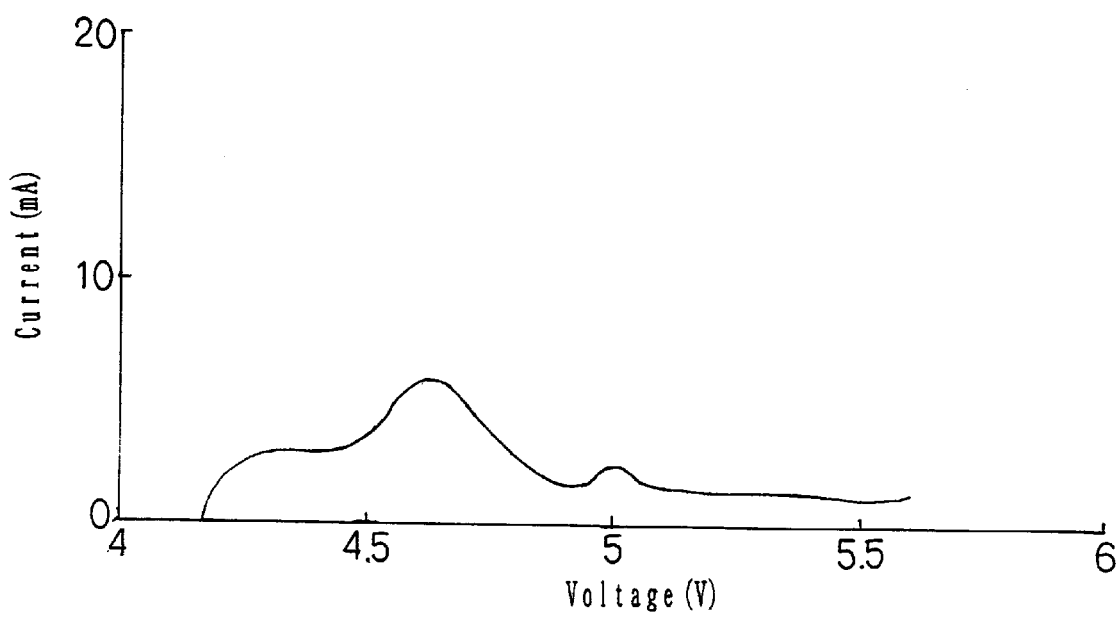
FIG. 4 is a graphical representation showing relationship between a current and a voltage which was obtained by subjecting a cell prepared in Example 2 to voltage sweep.
Figure 5:
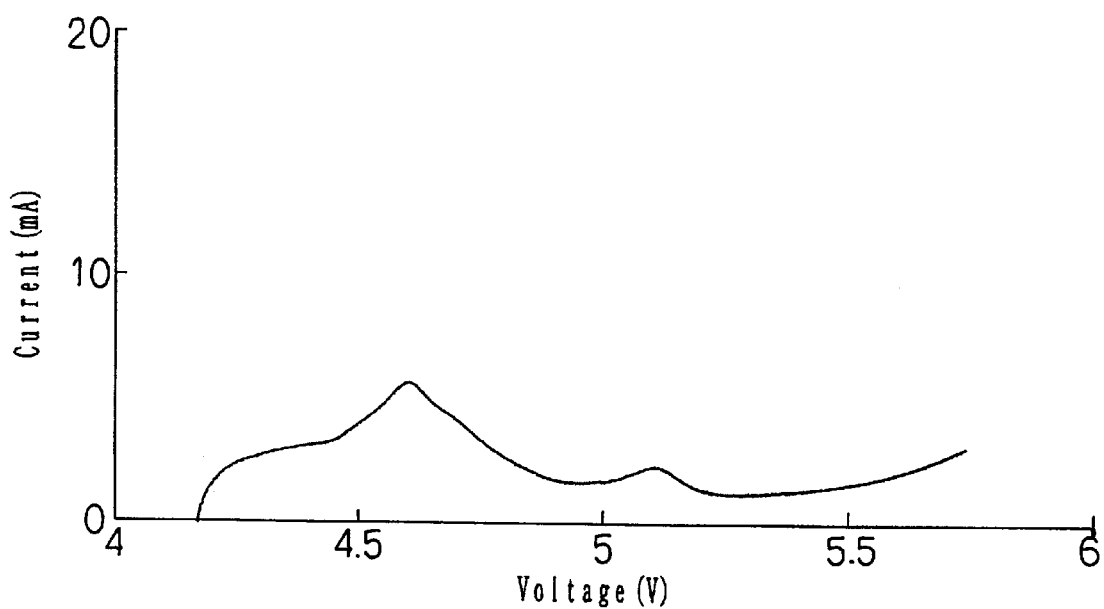
FIG. 5 is a graphical representation showing relationship between a current and a voltage which was obtained by subjecting a cell prepared in Example 3 to voltage sweep.
Figure 6:
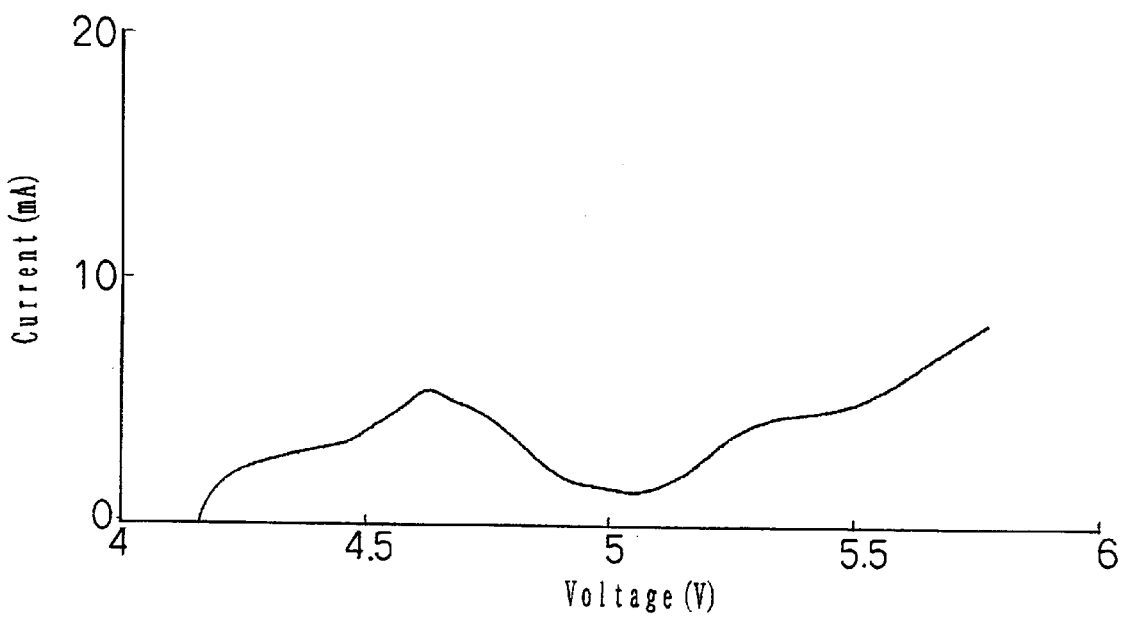
FIG. 6 is a graphical representation showing relationship between a current and a voltage which was obtained by subjecting a cell prepared in Comparative Example 1 to voltage sweep.
Figure 7:
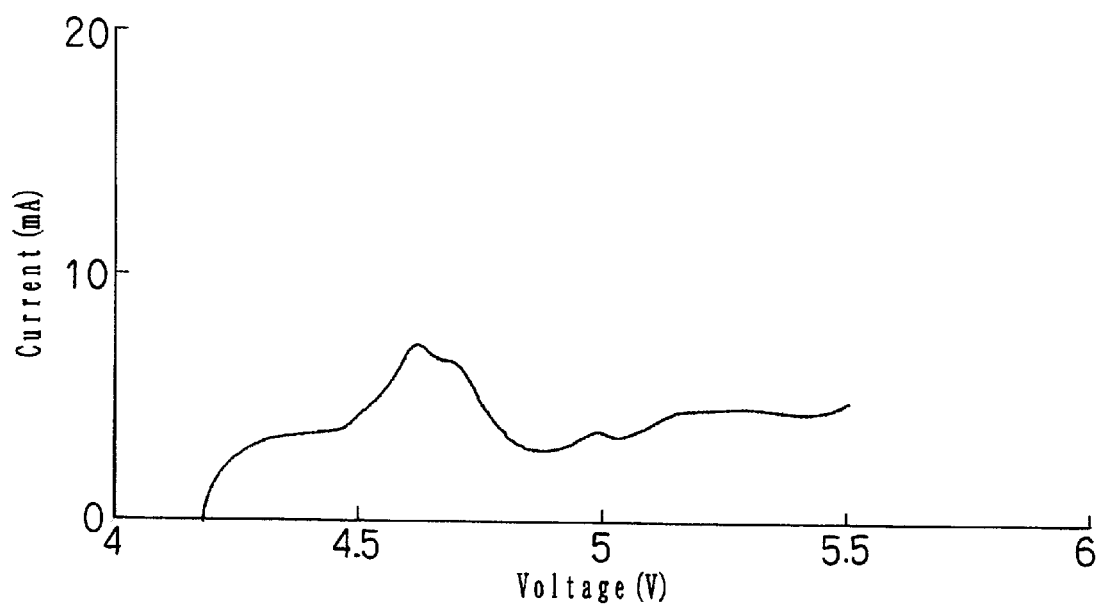
FIG. 7 is a graphical representation showing relationship between a current and a voltage which was obtained by subjecting a cell prepared in Comparative Example 2 to voltage sweep.
Figure 8:
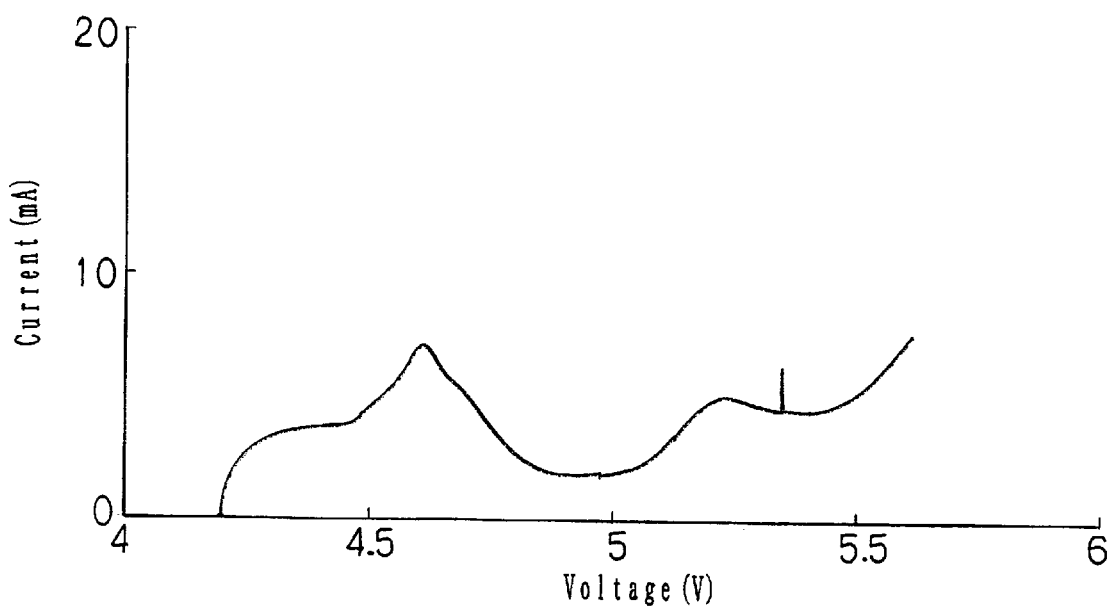
FIG. 8 is a graphical representation showing relationship between a current and a voltage which was obtained by subjecting a cell prepared in Comparative Example 3 to voltage sweep.
Figure 9:
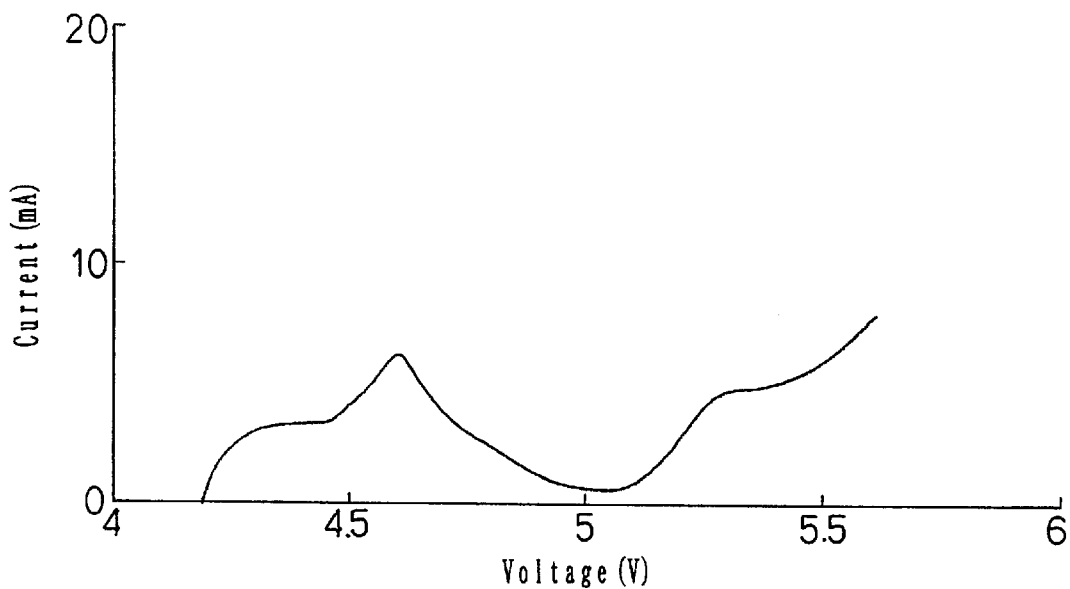
FIG. 9 is a graphical representation showing relationship between a current and a voltage which was obtained by subjecting a cell prepared in Comparative Example 4 to voltage sweep.
Figure 10:
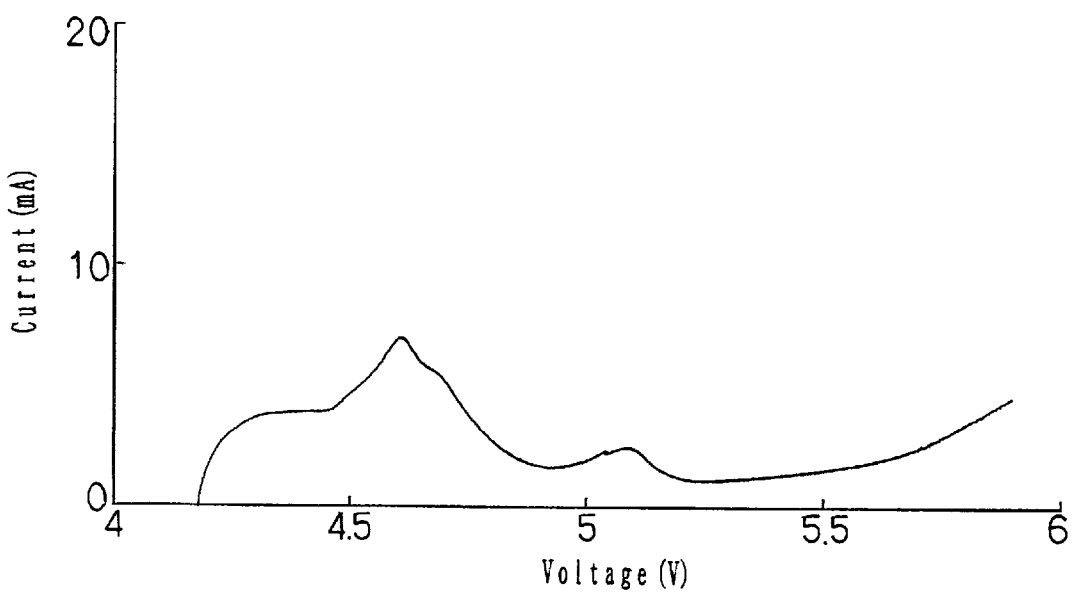
FIG. 10 is a graphical representation showing relationship between a current and a voltage which was obtained by subjecting a cell prepared in Comparative Example 5 to voltage sweep.
Figure 11:
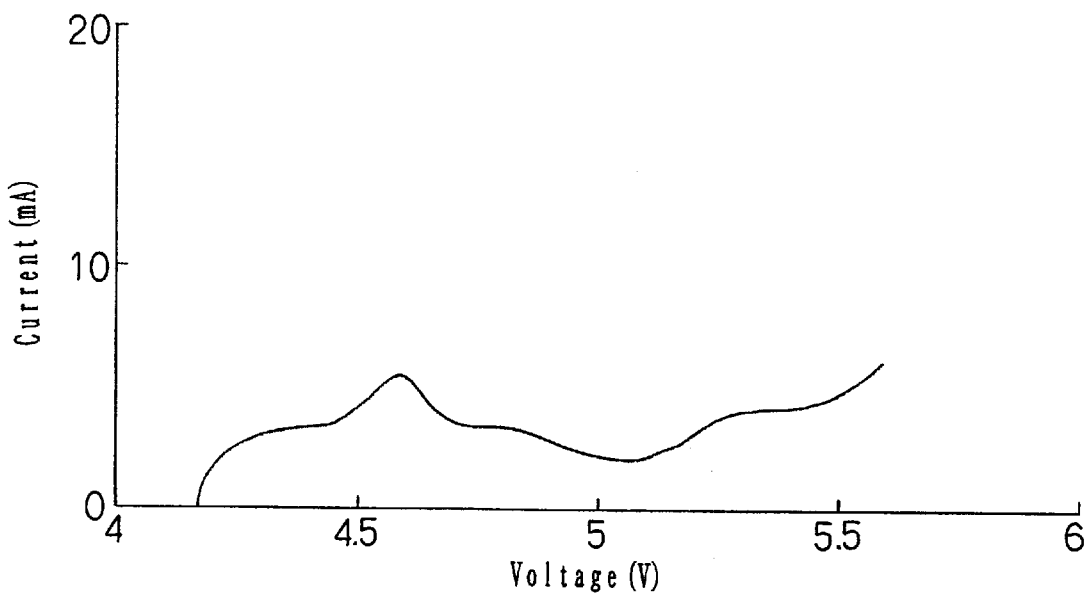
FIG. 11 is a graphical representation showing relationship between a current and a voltage which was obtained by subjecting a cell prepared in Comparative Example 6 to voltage sweep.
Figure 12:
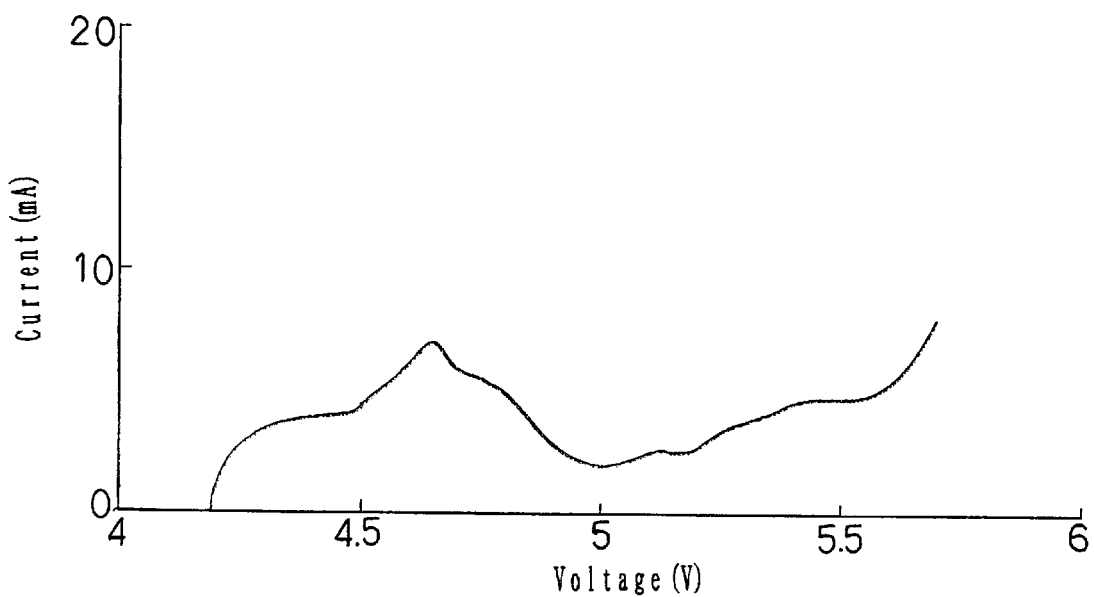
FIG. 12 is a graphical representation showing relationship between a current and a voltage which was obtained by subjecting a cell prepared in Comparative Example 7 to voltage sweep.
Figure 13:
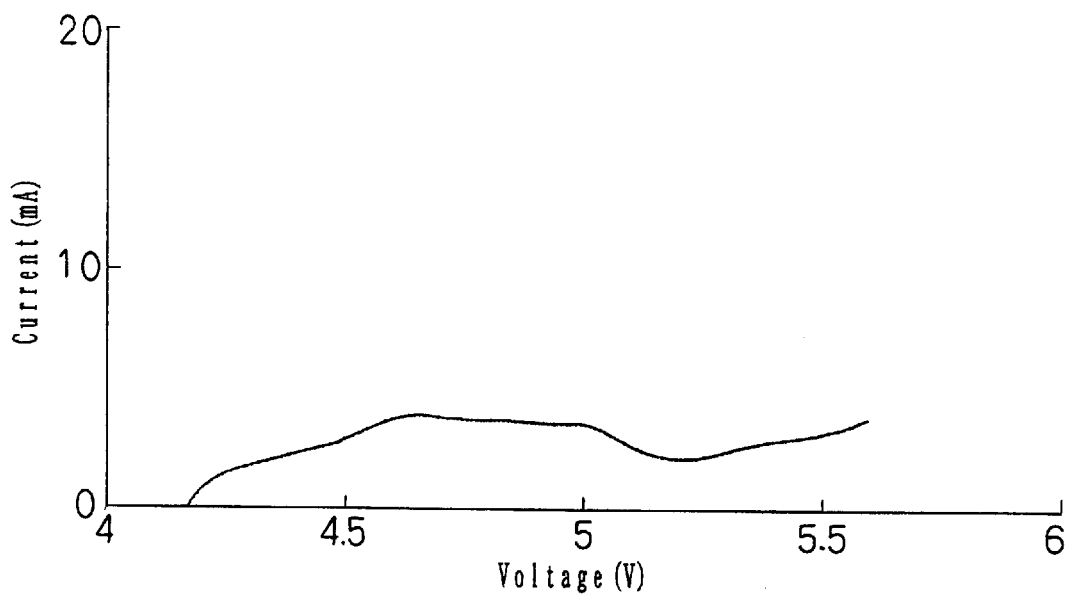
FIG. 13 is a graphical representation showing relationship between a current and a voltage which was obtained by subjecting a cell prepared in Comparative Example 8 to voltage sweep.
Figure 14:
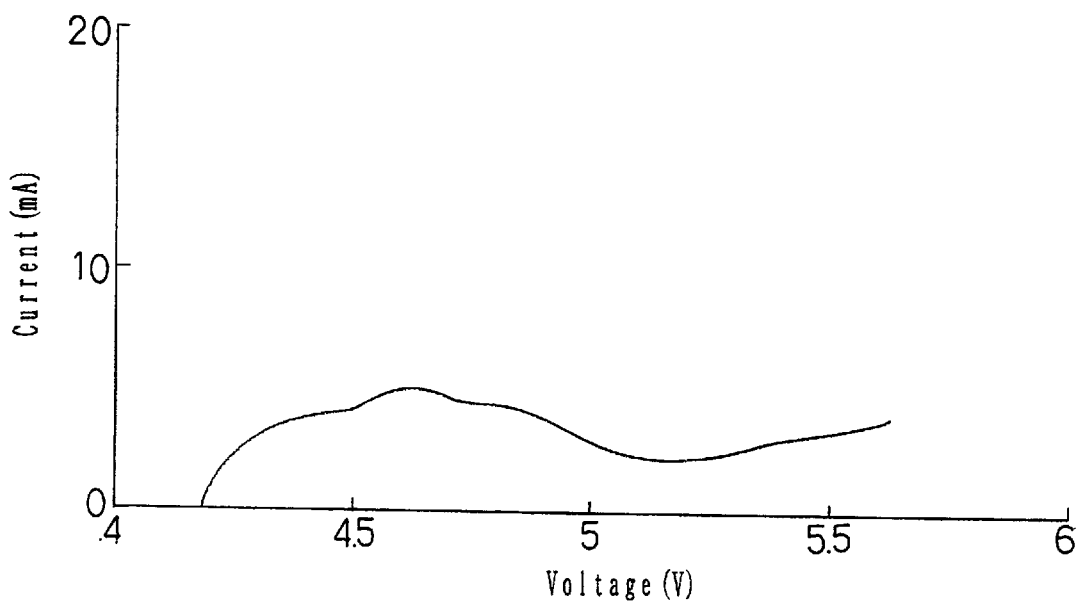
FIG. 14 is a graphical representation showing relationship between a current and a voltage which was obtained by subjecting a cell prepared in Comparative Example 9 to voltage sweep.
Figure 15:
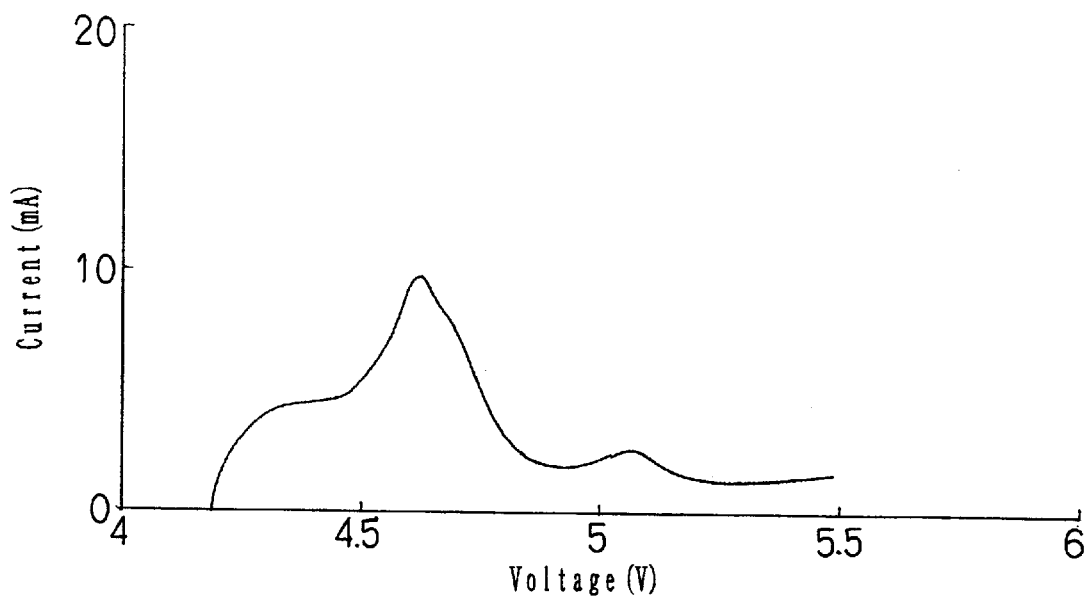
FIG. 15 is a graphical representation showing relationship between a current and a voltage which was obtained by subjecting a cell prepared in Comparative Example 10 to voltage sweep.
Figure 16:
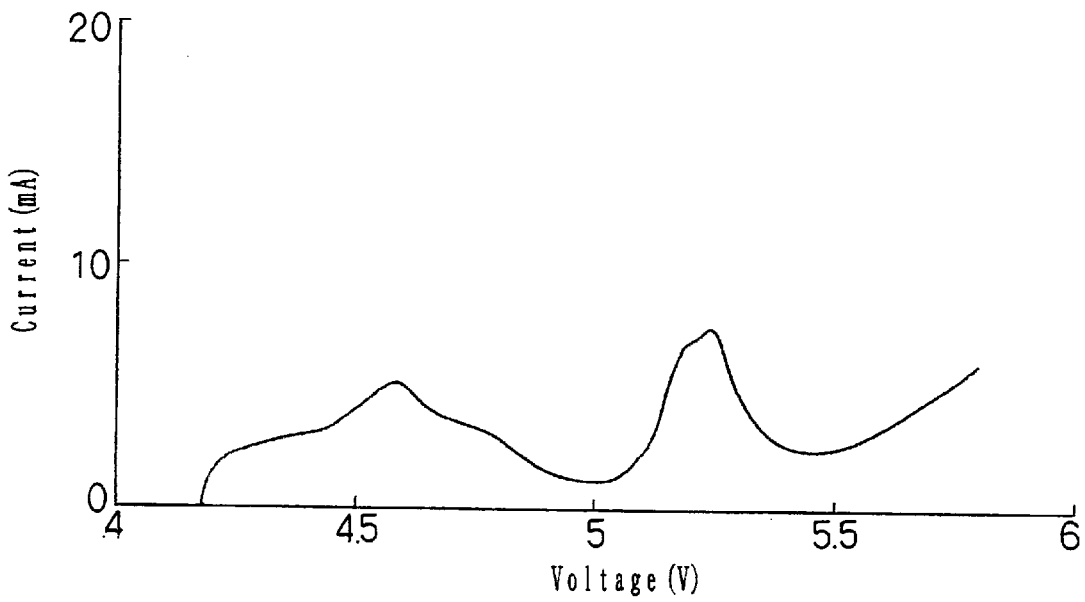
FIG. 16 is a graphical representation showing relationship between a current and a voltage which was obtained by subjecting a cell prepared in Comparative Example 11 to voltage sweep.
Figure 17:
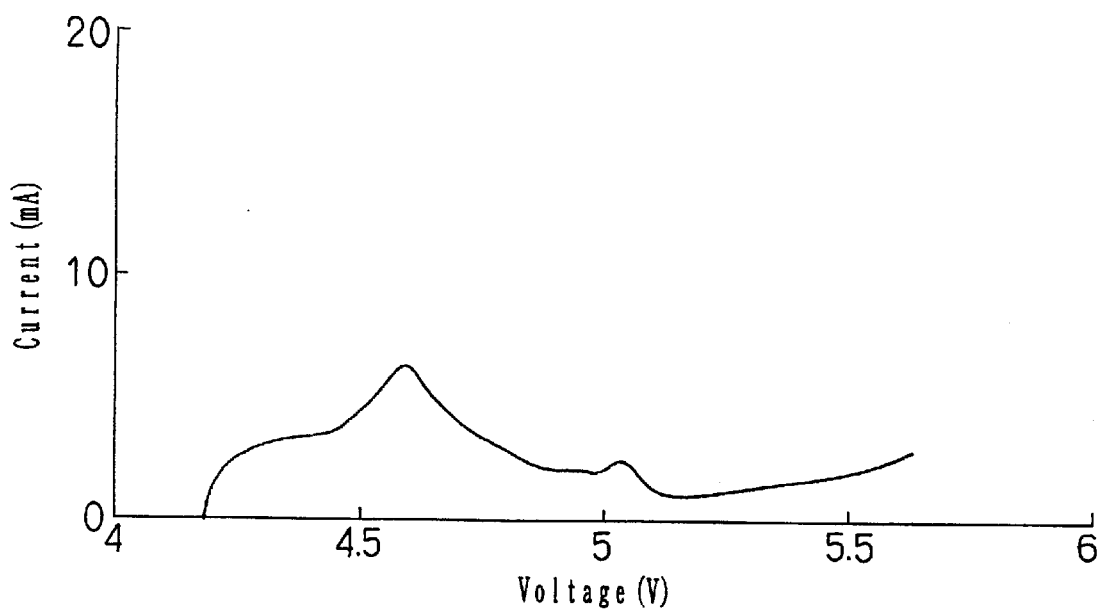
FIG. 17 is a graphical representation showing relationship between a current and a voltage which was obtained by subjecting a cell prepared in Comparative Example 12 to voltage sweep.

On the contrary, the cells obtained in Examples 1 to 3, as shown in FIGS. 3 to 5, each prevent a substantial increase in current thereof even when the cell voltage exceeds a level of about 5 to 5.1 V. In particular, the cell of each of Examples 1 and 2 wherein lithium phosphate and cobalt (II) phosphate are respectively added as the phosphate compound to the positive active material substantially restrains an increase in current thereof when the voltage reaches a decomposition voltage of the electrolyte. Such restraint of an increase in current flowing after the voltage exceeds the decomposition voltage effectively prevents the electrolyte from being decomposed even when the current breaking device fails in operation thereof due to any trouble or failure. Thus, it will be noted that the cell of each of the examples prevents breakage and/or explosion thereof even when the relief valve for pressure releasing fails in operation.

Such supercharging as described above occurs when any trouble or failure of a charging circuit causes constant-current charging to continue after full charging (4.2 V) as well, in the case that a cell is charged by means of a charging device which shifts charging of the cell from constant-current charging to constant-voltage charging when it exceeds full charging.

Then, cells were prepared under the same conditions as described above while varying the amount of the additive between 0.05% by weight and 20% by weight based on the positive active material ($Li_xCoO_2$). The cells each were subject to constant-voltage charging at a constant voltage of 4.2 V (upper limit current: 100 mA) at an ambient temperature of 25° C. for 20 hours. Then, each of the cells was discharged to a final voltage of 2.8 V at a constant current of 100 mA, resulting in a discharge capacity (mAh) of the cell being measured. The results were as shown in Table 1. Then, the cells thus charged and discharged each were subject to continuous charging at a charging current of 2.8 A, to thereby be supercharged, so that a rate (%) of occurrence of bursting or explosion in each of the cells was measured. Measurement of the rate was carried out using fifty (50) samples. The results were likewise as shown in Table 1.

Further, an increase in the amount of addition of the additive to a level above 15% by weight causes a reduction in discharge capacity of the cell. This is due to an increase in internal resistance of the cell due to low conductivity of lithium phosphate, cobalt (II) phosphate or strontium carbonate.

Then, cells were prepared under the same conditions as those of Examples 1 to 3 while varying an average particle diameter of lithium phosphate, cobalt (II) phosphate or strontium carbonate within a range of from 5 μm to 40 μm. The cells were subject to measurement of a rate of occurrence of bursting or explosion thereof under the same conditions as described above. The measurement was carried out using fifty samples. The results were as shown in Table 2.

TABLE 1

| Cell | Amount of Addition (% by weight) | | | | | | | |
|---|---|---|---|---|---|---|---|---|
| | 0.05 | 0.1 | 0.2 | 1 | 5 | 10 | 15 | 20 |
| Ex. 1 (mAh) | 1225 | 1224 | 1222 | 1220 | 1195 | 1175 | 1145 | 985 |
| $Li_3PO_4$ (%) | 6 | 2 | 0 | 0 | 0 | 0 | 0 | 0 |
| Ex. 2 (mAh) | 1220 | 1218 | 1222 | 1219 | 1198 | 1164 | 1140 | 992 |
| $Co_3(PO_4)_2$ (%) | 5 | 2 | 0 | 0 | 0 | 0 | 0 | 0 |
| Ex. 3 (mAh) | 1224 | 1223 | 1221 | 1220 | 1194 | 1173 | 1144 | 979 |
| $SrCO_3$ (%) | 6 | 3 | 1 | 0 | 0 | 0 | 0 | 0 |
| Comp. Ex. 1 (mAh) | 1230 | 1230 | 1230 | 1230 | 1230 | 1230 | 1230 | 1230 |
| No additive | 22 | 22 | 22 | 22 | 22 | 22 | 22 | 22 |
| Comp. Ex. 2 (mAh) | 1213 | 1211 | 1211 | 1207 | 1188 | 1166 | 1133 | 978 |
| $Li_2CO_3$ (%) | 8 | 4 | 2 | 2 | 0 | 2 | 0 | 0 |
| Comp. Ex. 3 (mAh) | 1218 | 1217 | 1217 | 1210 | 1190 | 1171 | 1135 | 975 |
| $Li_2C_2O_4$ (%) | 16 | 12 | 18 | 12 | 14 | 16 | 16 | 16 |
| Comp. Ex. 4 (mAh) | 1216 | 1215 | 1215 | 1208 | 1188 | 1169 | 1132 | 972 |
| $MnCO_3$ (%) | 18 | 12 | 12 | 12 | 16 | 14 | 14 | 12 |
| Comp. Ex. 5 (mAh) | 1219 | 1218 | 1217 | 1210 | 1290 | 1171 | 1133 | 972 |
| $CoCO_3$ (%) | 10 | 6 | 6 | 4 | 4 | 2 | 2 | 2 |
| Comp. Ex. 6 (mAh) | 1220 | 1220 | 1218 | 1211 | 1191 | 1172 | 1134 | 973 |
| $NiCO_3$ (%) | 16 | 12 | 14 | 14 | 12 | 14 | 12 | 14 |
| Comp. Ex. 7 (mAh) | 1210 | 1210 | 1207 | 1200 | 1181 | 1162 | 1125 | 966 |
| $Na_2CO_3$ (%) | 18 | 18 | 16 | 12 | 14 | 12 | 18 | 16 |
| Comp. Ex. 8 (mAh) | 1215 | 1215 | 1213 | 1205 | 1186 | 1168 | 1129 | 970 |
| $K_2CO_3$ (%) | 18 | 16 | 16 | 16 | 16 | 16 | 14 | 12 |
| Comp. Ex. 9 (mAh) | 1220 | 1219 | 1218 | 1211 | 1192 | 1173 | 1135 | 975 |
| $Rb_2CO_3$ (%) | 14 | 12 | 16 | 16 | 14 | 16 | 16 | 12 |
| Comp. Ex. 10 (mAh) | 1210 | 1209 | 1208 | 1201 | 1182 | 1163 | 1125 | 966 |
| $CaCO_3$ (%) | 16 | 18 | 16 | 14 | 16 | 14 | 16 | 12 |
| Comp. Ex. 11 (mAh) | 1209 | 1208 | 1208 | 1200 | 1181 | 1161 | 1123 | 961 |
| $MgCO_3$ (%) | 12 | 12 | 10 | 6 | 8 | 4 | 4 | 4 |
| Comp. Ex. 12 (mAh) | 1213 | 1212 | 1212 | 1203 | 1185 | 1166 | 1128 | 969 |
| $BaCO_3$ (%) | 10 | 6 | 6 | 4 | 4 | 2 | 4 | 2 |

Table 1 clearly indicates that the cells of Examples 1 to 3 each significantly prevent bursting or explosion thereof due to supercharging as compared with those of Comparative Examples 1 to 12. This is due to the fact that the cells of Examples 1 to 3 restrain an increase in charging current to substantially prevent decomposition of the electrolyte, even when the cell voltage exceeds the decomposition voltage. This is also noted from FIGS. 3 to 5.

Also, Table 1 indicates that a decrease in the amount of addition of lithium phosphate, cobalt (II) phosphate or strontium carbonate to a level below 0.2% by weight causes a rate of bursting or explosion of the cell to be increased. This is due to a reduction in generation of gas in the cell.

TABLE 2

| Cell | Average Particle Diameter (μm) | | | | | | | |
|---|---|---|---|---|---|---|---|---|
| | 5 | 10 | 15 | 20 | 25 | 30 | 35 | 40 |
| Ex. 1 $Li_3PO_4$ | 0 | 0 | 0 | 0 | 0 | 0 | 1 | 2 |
| Ex. 2 $Co_3(PO_4)_2$ | 0 | 0 | 0 | 0 | 0 | 0 | 2 | 2 |
| Ex. 3 $SrCO_3$ | 0 | 0 | 0 | 0 | 0 | 1 | 2 | 2 |

Table 2 indicates that an increase in average particle diameter of the additive to a level above 30 μm causes an increase in rate of the bursting or explosion of the cell. This is due to the fact that such an increase in average particle diameter causes a specific surface area of the additive based on a weight thereof to be increased, to thereby delay generation of gas with respect to an increase in cell voltage.

In each of the examples, lithium phosphate or cobalt (II) phosphate was used as the phosphate compound to be added in the positive active material layer. It was found that any other phosphate compound likewise exhibits substantially the same advantage as the above.

In addition, in each of the examples, $Li_xCoO_2$ was used as the positive active material. It was found that any other lithium double oxide such as $Li_xNiO_2$, $Li_xMnO_2$ or the like likewise exhibits substantially the same advantage.

As can be seen from the foregoing, the non-aqueous liquid electrolyte secondary cell of the present invention prevents a significant increase in charging current to keep the electrolyte from being decomposed, even when the current breaking device fails in operation due to any trouble or failure thereof to cause supercharging to further continue. Also, the cell of the present invention effectively prevents bursting or explosion thereof even when the relief valve for pressure release is not arranged therein or fails in operation thereof due to any failure.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A non-aqueous liquid electrolyte secondary cell comprising:

a positive electrode including a positive collector and a positive active material layer formed on the positive collector, the positive active material layer comprising a positive active material consisting of a lithium transition metal oxide and an additive selected from the group consisting of a phosphate compound and strontium carbonate;

a negative electrode including a negative collector and a negative active material layer formed on the negative collector, the negative active material layer comprising a negative active material having lithium ion occluding and releasing properties; and a current-breaking device for interrupting electrical connection between said positive and negative electrodes and cell terminals.

2. A non-aqueous liquid electrolyte secondary cell as defined in claim 1, wherein said phosphate compound is selected from the group consisting of lithium phosphate and cobalt (II) phosphate.

3. A non-aqueous liquid electrolyte secondary cell as defined in claim 1, wherein said phosphate compound is present in an amount of 0.2 to 15% by weight based on said positive active material.

4. A non-aqueous liquid electrolyte secondary cell as defined in claim 1, wherein said phosphate compound has an average particle diameter of 30 $\mu$m or less.

5. A non-aqueous liquid electrolyte secondary cell as defined in claim 1, wherein said lithium transition metal oxide is represented by LixMO2, in which M is at least one transition metal and x is between 0.05 and 1.10 ($0.05 \leq x \leq 1.10$).

6. A non-aqueous liquid electrolyte secondary cell as defined in claim 1, further comprising a relief valve for releasing pressure in said cell when an internal pressure of said cell reaches a predetermined level or higher;

said positive electrode and negative electrode being wound up with an electrolyte layer which contains a non-aqueous liquid electrolyte being interposed therebetween.

7. A non-aqueous liquid electrolyte secondary cell comprising:

a non-aqueous liquid electrolyte made by dissolving $LiPF_6$ in a mixed solvent of propylene carbonate, dimethyl carbonate and diethyl carbonate;

a positive electrode including a positive collector and a positive active material layer formed on the positive collector, the positive active material layer comprising a positive active material represented by $Li_xCoO_2$, where x is between 0.05 and 1.10 ($0.05 \leq x \leq 1.10$), and an additive selected from the group consisting of lithium phosphate and cobalt (II) phosphate;

a negative electrode including a negative collector and a negative active material layer formed on the negative collector, the negative active material layer comprising a negative active material consisting of amorphous carbon having lithium ion occluding and releasing properties;

a current breaking device for interrupting electrical connection between said electrodes and cell terminals when an internal pressure of said cell is excessively increased; and a relief valve for releasing a pressure in said cell when an internal pressure of said cell reaches a predetermined level or above;

said phosphate compound being contained in an amount equal of 0.2 to 15% by weight based on said positive active material;

said phosphate compound having an average particle diameter of 30 $\mu$m or less;

said positive electrode and negative electrode being spirally wound up while interposing an electrolyte layer containing said electrolyte therebetween.

* * * * *

UNITED STATES PATENT AND TRADEMARK OFFICE
CERTIFICATE OF CORRECTION

PATENT NO. : 5,962,167
DATED : October 5, 1999
INVENTOR(S) : Nakai et al.

It is certified that error appears in the above-indentified patent and that said Letters Patent is hereby corrected as shown below:

Column 1, Line 24, delete "potable" and insert --portable--.

Column 3, Line 43, delete "Ca PO$_4$)$_2$" and insert --Ca(PO$_4$)$_2$--.

Signed and Sealed this

Eleventh Day of April, 2000

Attest:

Q. TODD DICKINSON

Attesting Officer

Director of Patents and Trademarks